United States Patent [19]

Bowden

[11] 4,165,065
[45] Aug. 21, 1979

[54] LIME REMOVAL FROM FURNACE SURFACES

[76] Inventor: James J. Bowden, 399 Quarry La. NE., Warren, Ohio 44484

[21] Appl. No.: 884,904

[22] Filed: Mar. 9, 1978

[51] Int. Cl.$^2$ .............................................. C21B 7/00
[52] U.S. Cl. ........................................................ 266/44
[58] Field of Search .................... 264/30, DIG. 35; 266/44, 135

[56] References Cited

U.S. PATENT DOCUMENTS

| | | | |
|---|---|---|---|
| 1,117,814 | 11/1914 | Dutton | 266/135 |
| 3,678,143 | 7/1972 | Harnish et al. | 264/30 |
| 3,960,546 | 6/1976 | Rote et al. | 266/135 |
| 4,010,023 | 3/1977 | Bowden | 75/68 R |

Primary Examiner—John McQuade
Attorney, Agent, or Firm—Michael Williams

[57] ABSTRACT

My invention is particularly adapted for use in steel-making furnaces which have a charge-receiving vessel comprising a bottom and side walls for containing the molten steel and slag, such as the open hearth and electric furnaces. Lime is a major constituent of steel-making slags but it has a tendency to build up on the furnace bottom after successive steel-making operations. I have discovered that by adding a mineral, such as alumina or the like to the built-up lime and applying heat, the lime and alumina will chemically combine to form another mineral having a melting point low enough so that it may be liquified for drainage from the furnace.

4 Claims, No Drawings

LIME REMOVAL FROM FURNACE SURFACES

BACKGROUND AND SUMMARY

In the manufacture of steel in the open hearth furnace, the usual method of operation is to charge the furnace vessel with limestone and/or lime, steel scrap and pig iron, in that sequence. In the electric furnace, no pig iron is used. The metallic charge is then melted by heat of an extraneous fuel, such as oil or gas in the case of the open hearth furnace, or electricity in the case of the electric furnace.

Lime is an important and major constituent of steel-making slags and there has always been a tendency to charge more than enough lime into the furnace vessel in order to insure that enough lime is present. However, the lime has a high melting point (2570 degrees Centigrade) and the furnace vessel and its lining containing the melt will not stand up at the temperature needed to fluidize lime.

Accordingly, in the present steel-making process, other minerals, such as alumina, fluorspar, iron oxide and the like, have been added to lower the melting point of the lime. As the lime becomes fluid, it rises through the molten metal in the furnace vessel and goes to the top thereof, and in the process combines with undesirable elements in the pig iron or scrap, to form the slag.

Because of the fact that lime is so difficult to fluidize, and because an excess is frequently used in the furnace charge, there is a tendency for lime build-up on the furnace bottom which, in time produces undesirable results, as will be pointed out hereinafter. I have discovered that lime build-up may be overcome by periodically adding to the vessel, after the melt has been tapped, one or a combination of the minerals used to reduce the melting point of the lime in the steel-making process so as to fluidize the lime and permit it to be removed through the furnace tap hole.

DESCRIPTION OF THE PREFERRED EMBODIMENT

As before pointed out, during the course of repeated steel-making operations in the open hearth or electric furnaces, there is a tendency for lime to build up on the bottom of the vessel. After a period of time, this build-up will interfere with good steel-making practice since it represents a quantity of lime already in the furnace prior to normal charging. Therefore, the next charge into the furnace, which consists of lime in an amount normally used, and then the pig and scrap iron, will cause an overabundance of lime in the furnace, which in turn causes more lime build-up. This overabundance of lime requires the addition of more than a normal amount of minerals to lower the melting point of the lime, and this represents added cost to the steel-making operation. Further, because of the high melting point of lime, the lime build-up acts as a heat insulator at the furnace bottom, and therefore a higher degree of heat will be required in the steel-making operation, which causes deterioration of the vessel lining. And, if the build-up is great enough, it will reduce the capacity of the furnace.

Heretofore, lime build-up was tolerated because no one knew what to do about it. Thus, when the build-up became too great, the furnace was torn down and relined, a costly matter, since it not only puts the furnace out of operation, but also represented costly labor and materials.

I have discovered that the vessel bottom may be kept free of serious lime build-up by adding to the furnace, preferably right after the furnace has been tapped so that it is still hot, any one or a combination of several minerals which are normally used in the steel-making practice to lower the melting point of lime. Such minerals may be of the class consisting of alumina, fluorspar, ferrous oxide, ferric oxide, ilmenite, lumnite cement, Portland cement, dicalcium ferrite, dicalcium silicate and silica. A low-cost alumina compound, manufactured by me under the name Bowflux, and described in U.S. Pat. No. 4,010,023 issued to me, has been used successfully, and it is to be understood that this alumina compound is to be included within the term "alumina."

The amount of the above-mentioned minerals to be added to the furnace vessel will be dependent upon the type of mineral used and upon the amount of lime build-up. However, an excessive amount of such minerals will do no harm since the melting point thereof is well within the temperature which will be tolerated by the furnace lining. It is known that a proportion of about one part alumina will combine satisfactorily with 2 to 3 parts of lime, and this may be used as a gauge in determining the amount of alumina, or alumina compound, required for a particular size of lime build-up.

At the present time, alumina, and preferably Bowflux, is a preferred mineral, and it has been found that a mixture of alumina and iron oxide, both in small particle form, provide an ideal combination for fluidizing the lime build-up. A presently preferred proportion of such mixture is about 40% alumina and about 60% iron oxide.

This mixture may be introduced into the furnace vessel and on top of the lime build-up in any suitable manner, and preferably right after the furnace has been tapped and the molten steel and slag have been drained from the furnace, and the tap hole is still open. If the furnace is not hot enough to cause the added minerals to chemically combine with the built-up lime, further heat may be applied to the furnace.

The mixture of alumina and iron oxide, when applied to the built-up lime, will rapidly combine therewith to form a new mineral, tetra calcium alumino ferrite, a mineral having a melting point well within the temperature tolerated by the furnace lining, and this new mineral when liquified by furnace heat, may be drained through the vessel tap hole.

I claim:

1. The method of removing lime buildup on the vessel bottom of a steel-making furnace, said lime having a melting point of about 2570 degrees Centigrade and which is higher than the temperature limits tolerated by the lining of said vessel, said method comprising:
    charging into the furnace vessel and onto the built up lime, after the molten metal and slag have been drained from said vessel through its tap hole, a mineral which chemically combines with lime to form a combined mineral having a melting point lower than the melting point of lime and within the temperature limits tolerated by the furnace lining,
    heating said combined mineral to a liquid state, and
    draining the liquified mineral from said vessel through the latter's tap hole.

2. The method according to claim 1 wherein said charged mineral is from the class consisting of alumina, fluorspar, ferrous oxide, ferric oxide, ilmenite, lumnite cement, Portland cement, dicalcium ferrite, dicalcium silicate and silica.

3. The method of claim 1 wherein said charged mineral is a mixture of alumina and iron oxide to chemically combine with the built-up lime to form the mineral tetra calcium alumino ferrite.

4. The method of claim 3 wherein said alumina and iron oxide are in small particle state, and mixed in the proportion of about 60% iron oxide and 40% alumina.